(12) United States Patent
Liu

(10) Patent No.: US 7,708,476 B2
(45) Date of Patent: May 4, 2010

(54) INDEX-MATCHING GEL FOR NANO-ENGINEERED OPTICAL FIBERS AND MECHANICAL SPLICE ASSEMBLIES AND CONNECTORS USING SAME

(75) Inventor: Ziwei Liu, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/218,854

(22) Filed: Jul. 18, 2008

(65) Prior Publication Data

US 2010/0014817 A1    Jan. 21, 2010

(51) Int. Cl.
*G02B 6/255* (2006.01)
*G02B 6/032* (2006.01)

(52) U.S. Cl. .............................. 385/98; 385/99; 385/125
(58) Field of Classification Search ................... 385/98, 385/99, 125
See application file for complete search history.

(56) References Cited

U.S. PATENT DOCUMENTS

2007/0196055 A1*    8/2007    Kato et al. .................... 385/78

* cited by examiner

*Primary Examiner*—Jerry T Rahll

(57) ABSTRACT

An index-matching gel for use with nano-engineered optical fibers is disclosed. The index-matching gel is cross-linked, which prevents the gel from wicking into the voids and down the nano-engineered optical fiber to a depth where the fiber performance and/or device performance is compromised. The formulation comprises a non-reactive constituent A, two reactive constituents B and C, and a catalyst D. The gel is pre-cured and forms a cross-linked internal network that results in a single-component gel that does not require meter mixing of an additional constituent or heat curing. The gel is suitable for use in the mechanical splicing of optical fibers when at least one of the optical fibers is a nano-engineered optical fiber. The gel is also suitable for use in fiber optic connectors wherein at least one of the optical fibers constituting the connection is a nano-engineered optical fiber.

35 Claims, 12 Drawing Sheets

INDEX-MATCHING GEL FOR NANO-ENGINEERED OPTICAL FIBERS AND MECHANICAL SPLICE ASSEMBLIES AND CONNECTORS USING SAME

BACKGROUND OF THE INVENTION

1. Field of the Invention

The present invention relates generally to index-matching materials used for splicing optical fibers, and in particular relates to index-matching gels suitable for use with nano-engineered optical fibers, and the use of such gels in mechanical splice assemblies and fiber optic connectors.

2. Technical Background

Optical fibers are widely used in a variety of applications, including the telecommunications industry, in which optical fibers are employed in a number of telephony and data transmission applications. Due, at least in part, to the extremely wide bandwidth and the low noise operation provided by optical fibers, the use of optical fibers and the variety of applications in which optical fibers are used are continuing to increase. For example, optical fibers no longer serve merely as a medium for long distance signal transmission, but increasingly are being routed directly to the home or, in some instances, directly to a desk or other work location.

The ever increasing and varied use of optical fibers has spurred the use of fiber optic splice assemblies and connectors. A splice assembly connects one optical fiber to another. Fiber optic connectors are used to terminate the ends of optical fibers and enable faster connection and disconnection than fusion splicing. A typical splice assembly and a typical connector each hold the end of each optical fiber in a ferrule. The ferrule serves to align the respective cores of the two fibers so that light can pass between the ends of the fibers. Certain connectors are formed using splice assemblies.

Splice assemblies and connectors have traditionally generated concern because they introduce loss and because different connector types were typically not compatible. While the use of splice assemblies and connectors was once problematic, manufacturers have taken steps to standardize and simplify them. This increasing user-friendliness has contributed to the increase in the use of fiber optic systems.

To transmit optical signals between two optical fibers efficiently, the splice assembly or connector must not significantly attenuate or alter the transmitted signals. However, while splice assemblies and connectors provide two easy ways to connect two optical fibers (or sets of optical fibers), they also introduce attenuation, which is typically in the range from about 0.05 dB to 0.5 dB. To mitigate attenuation effects in the splice assembly or connector, an index-matching material (typically, a fluid) is often used. The index-matching material is held within the splice assembly or connector so that it presents itself at the interface between the two fiber ends. The index-matching material serves to reduce attenuation due to reflections from the index mismatch at the fiber-fiber interface.

With the advent of so-called nano-engineered optical fibers that have voids at their end face, the use of standard index-matching fluids and gels has become problematic because the fluid or gel tends to migrate or "wick" into the fiber through the voids. An index-matching gel is needed that at most only minimally migrates into the nano-engineered fiber end, while also having robust mechanical properties (and in particular viscoelastic properties) over the range of conditions (e.g., temperature ranges) the gel would typically experience in the field.

SUMMARY OF THE INVENTION

An aspect of the invention is a cross-linked, index-matching gel for use with nano-engineered optical fibers. The gel is suitable for use in the mechanical splicing of optical fibers when at least one of the optical fibers is a nano-engineered optical fiber. The gel is also suitable for use in fiber optic connectors wherein at least one of the optical fibers constituting the connection is a nano-engineered optical fiber having at least one refractive index (e.g., a core refractive index) of $n_f$.

The index-matching gel has a formulation comprising a non-reactive constituent A, two reactive constituents B and C, and a catalyst D that, when pre-cured, forms a cross-linked single-component gel that does not require meter mixing with an additional constituent or heat curing. The gel has a refractive index $n_g$ within 5% of at an operating wavelength of the nano-engineered optical fiber. In an example embodiment, $n_g$ is about 1.46 at the operating wavelength. Example operating wavelengths $\lambda$ are 1310 nm and 1550 nm.

Another aspect of the invention is a mechanical splice assembly. The assembly includes a ferrule having opposite front and back ends, an interior chamber between the front and back ends, and front and back channels open to the interior chamber and open at the front and back ends, respectively. The assembly includes a first optical fiber having an end and held in the front channel so that the first optical fiber end resides within the interior chamber. In one example, the first optical fiber is a stub optical fiber that ends at the ferrule front end. The assembly also includes the above-described index-matching gel contained in the interior chamber.

Another aspect of the invention is a fiber optic connector. The connector includes a stub optical fiber and a field optical fiber having a nano-engineered region with voids. The connector includes a splice assembly configured to interface the stub and field optical fibers together at their respective ends. The above-described index-matching gel is provided at the interface of the stub and field optical fibers. The connector may also include a ferrule holder and a connector housing that houses the ferrule holder.

Additional features and advantages of the invention will be set forth in the detailed description that follows, and, in part, will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention and are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
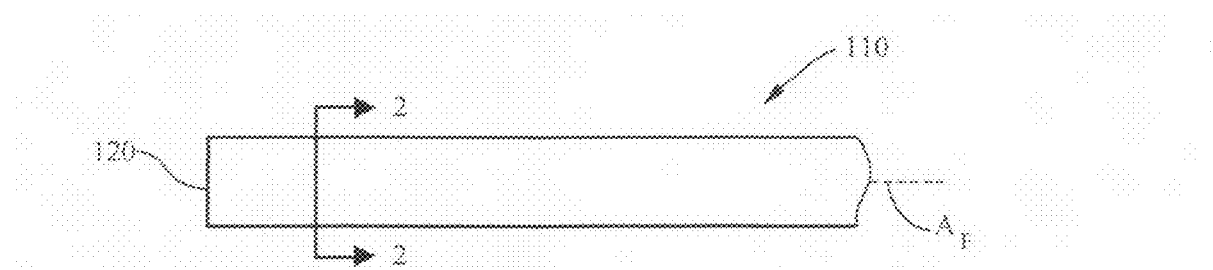
FIG. 1 is a schematic side view of an end section of a nano-engineered optical fiber cable.

Reference is now made in detail to the present preferred embodiments of the invention, examples of which are illustrated in the accompanying drawings. Whenever possible, the same reference numbers and symbols are used throughout the drawings to refer to the same or like parts.

Nano-Engineered Fibers

There are a number of "nano-engineered" (or "holey") optical fibers on the market today with one or more regions with periodically or aperiodically arranged small holes or voids, which make the fiber extremely bend insensitive. Examples of such optical fibers are described in, for example, U.S. Pat. No. 6,243,522, pending U.S. patent application Ser. No. 11/583,098 filed Oct. 18, 2006, and provisional U.S. patent application Ser. Nos. 60/817,863 filed Jun. 30, 2006, 60/817,721 filed Jun. 30, 2006, 60/841,458 filed Aug. 31, 2006, 60/841,490 filed Aug. 31, 2006, and 60/879,164, filed Jan. 8, 2007 (hereinafter, "the Corning nano-engineered fiber patents and patent applications"), all of which are assigned to Corning Incorporated and all of which are incorporated by reference herein.

One type of nano-engineered optical fiber developed by Corning, Inc. has an annular ring of non-periodic airlines (of diameter $\sim 1 \times 10^{-7}$ m) that extend longitudinally (axially) along the length of the fiber. The region with the ring of airlines has a reduced apparent or average index of refraction because air has an index of refraction of approximately 1 compared with the fused silica matrix refractive index of approximately 1.46. The ring of airlines is positioned to create a refractive index profile that enables superior bend performance (optically) and significantly smaller minimum bend radius specifications.

As discussed above, the use of nano-engineered optical fibers in combination with conventional index-matching materials, however, can be problematic. Certain index-matching materials are commonly used for non-nano-engineered optical fibers. However, such materials could possibly migrate (or "wick") into the airlines (voids) from the fiber end-face over time. This movement may also occur with variations in temperature. Filling the airlines with a material index-matched to silica raises their index of refraction from approximately 1 to approximately 1.46, resulting in a change in the fiber index profile, which leads to increased optical loss when the fiber is bent. This reduces or eliminates an important property of enhanced bend performance of the nano-engineered fiber. Likewise, in a nano-engineered fiber in the form of a photonic crystal fiber or "holey fiber," the fiber attenuation (straight fiber) is increased substantially when the holes are filled with an index-matching material.

Example Nano-Engineered Optical Fiber Cable

The index-matching gel of the present invention is suitable for use in connection with nano-engineered optical fibers, and in particular for forming mechanical splices with one or more of such fibers in mechanical splice assemblies used, for example, in fiber optic connectors.

Figure 2:
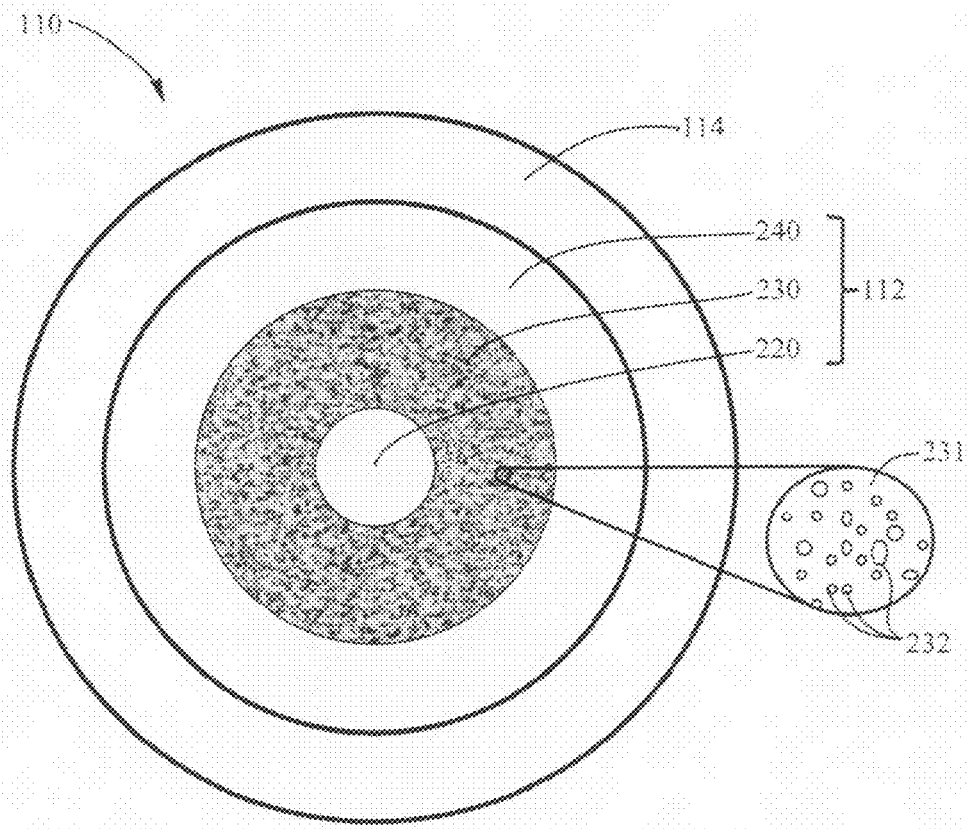
FIG. 2 is a cross-sectional diagram of the nano-engineered optical fiber cable of FIG. 1 as viewed along the direction 2-2, and includes an inset showing a close-up view of the void structure for an example embodiment of a nano-engineered region having non-periodically arranged voids.

FIG. 1 is a schematic side view of an end section of an example embodiment of nano-engineered optical fiber cable 110 that includes a nano-engineered optical fiber 112 with a protective cover 114. Nano-engineered optical fiber 112 has an end 120 and a central axis AF. FIG. 2 is a schematic cross-section of cable 110 as viewed along the direction 2-2 in FIG. 1. Nano-engineered optical fiber cable 110 can include, for example, any one of the various types of nano-engineered optical fibers 112, such as any of the so-called "holey" fibers, or those described in the abovementioned Corning nano-engineered fiber patents and patent applications. In an example embodiment, nano-engineered optical fiber 112 includes a core region ("core") 220, a nano-engineered region 230 surrounding the core, and a cladding region 240 ("cladding") surround the nano-engineered region. Other ring-type configurations for nano-engineered optical fiber 112 are also known.

In an example embodiment, nano-engineered region 230 comprises a glass matrix ("glass") 231 having formed therein non-periodically disposed holes (also called "voids" or "airlines") 232, such as the example voids shown in detail in the magnified inset of FIG. 2. In another example embodiment, voids 232 may be periodically disposed, such as in a photonic crystal optical fiber, wherein the voids typically have diameters between about $1 \times 10^{-6}$ m and $1 \times 10^{-5}$ m. Voids 232 may also be non-periodic airlines. In an example embodiment, glass 231 is fluorine-doped, while in another example embodiment the glass is undoped, pure silica. By "non-periodically disposed" or "non-periodic distribution," it is meant that when one takes a cross-section of the optical fiber (such as shown in FIG. 2), the voids 232 are randomly or non-periodically distributed across a portion of the fiber. Cross sections similar to FIG. 2 taken at different points along the length of nano-engineered optical fiber 112 will reveal different cross-sectional hole patterns, i.e., various cross-sections will have different hole patterns, wherein the distributions of holes and the sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber (and thus have a longer dimension along the length of the fiber), but do not extend over the entire length of the fiber for typical lengths of transmission fiber. While not wishing to be bound by theory, it is believed that the holes extend less than a few meters and, in many cases, less than 1 meter along the length of the fiber.

If non-periodically disposed holes/voids 232 are employed in nano-engineered region 230, it is desirable in one example embodiment that they be formed such that greater than 95% of and preferably all of the holes exhibit a mean hole size in the cladding for the optical fiber that is less than 1550 nm, more preferably less than 775 nm, and most preferably less than about 390 nm. Likewise, it is preferable that the maximum diameter of the holes in the fiber be less than 7000 nm, more preferably less than 2000 nm, even more preferably less than 1550 nm, and most preferably less than 775 nm. In some embodiments, the fibers disclosed herein have fewer than 5000 holes, in some embodiments fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of the optical fiber would exhibit fewer than 200 holes, the holes having a maximum diameter of less than 1550 nm and a mean diameter of less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× to about 4000× and image analysis software such as ImagePro, which is available from Media Cybernetics, Inc. of Silver Spring, Md., USA.

In an example embodiment, holes/voids 232 can contain one or more gases, such as argon, nitrogen, or oxygen, or the holes can contain a vacuum with substantially no gas; regardless of the presence or absence of any gas, the refractive index of the hole-containing region is lowered due to the presence of the holes. The holes/voids 232 can be randomly or non-periodically disposed, while in other embodiments the holes are disposed periodically. In some embodiments, the plurality of holes 232 comprises a plurality of non-periodically disposed holes and a plurality of periodically disposed holes. Alternatively or in addition, as mentioned above, the depressed index can also be provided by downdoping the glass in the hole-containing region (such as with fluorine) or updoping one or both of the surrounding regions.

Nano-engineered region 230 can be made by methods that utilize preform consolidation conditions, which are effective in trapping a significant amount of gases in the consolidated glass blank, thereby causing the formation of voids in the consolidated glass optical fiber preform. Rather than taking steps to remove these voids, the resultant preform is used to form an optical fiber with voids, or holes, therein. As used herein, the diameter of a hole is the longest line segment, the endpoints of which are disposed on the silica internal surface, defining the hole when the optical fiber is viewed in perpendicular cross-section transverse to the optical fiber central axis AF.

An example nano-engineered fiber 112 was analyzed in connection with using the index-matching gel 100 of the present invention. SEM analysis of the end face of an example nano-engineered optical fiber 112 showed an approximately 4.5 micron radius $GeO_2$—$SiO_2$ void-free core (having an index of approximately +0.34 percent delta versus silica) surrounded by a 11 micron outer radius void-free near clad region in turn surrounded by a 14.3 micron outer radius non-periodic void-containing cladding region (ring thickness of approximately 3.3 microns), which is surrounded by a void-free pure silica outer cladding having an outer diameter of about 125 microns (all radial dimensions measured from the center of the optical fiber).

The nano-engineered region comprised approximately 2.5 percent regional area holes (100 percent N2 by volume) in that area with an average diameter of 0.28 microns, a minimum diameter of 0.17 microns, and a maximum diameter of 0.48 microns, resulting in about 130 total holes in the fiber cross-section. The total fiber void area percent (area of the holes divided by total area of the optical fiber cross-section× 100) was about 0.05 percent. Optical properties for this fiber were 0.36 and 0.20 dB/Km at 1310 and 1550 nm, respectively, and a 22 meter fiber cable cutoff of about 1250 nm, thereby making the fiber single mode at wavelengths above 1250 nm.

Nano-engineered optical fiber cable 110 has at least one refractive index $n_f$ such as the refractive index of core 220. In an example embodiment, the core refractive index is about 1.46 at an operating wavelength of the nano-engineered optical fiber cable. Example operating wavelengths are 1310 nm and 1550 nm.

Index-Matching Gel

An example of a common index-matching material used today with conventional (i.e., non-nano-engineered) optical fibers is a low-viscosity index polymer with a molecular weight of typically less than 30,000 Daltons, to which is added a small amount of gelling agent such as fumed silica or metal soap to make the gel phixotropic. Index-matching gels having certain refractive indices can be formed using polymers, and methods for their production are known in the prior art. Such materials are popular because they are inexpensive and do not require significant technical expertise to manufacture.

Dow Corning Corp., of Midland, Mich. produces a commercialized two part index-matched silicone gel that cures at an elevated temperature after two parts are mixed together. After cure, this gel is capable of reducing oil migration in a nano-engineered optical fiber. However, the Dow Corning formulation requires meter mixing and curing. During the cure, air bubbles can be generated, and connector performance is extremely susceptible to even micro size air bubbles. It should be noted here that the cure is performed after the mix is added to the particular connector structure and therefore is not visible to an observer, so one cannot easily tell if and when air bubbles are formed. The Dow Corning index gel is also quite hard and brittle, making it difficult for fiber insertion during connector assembly.

Figure 3A:
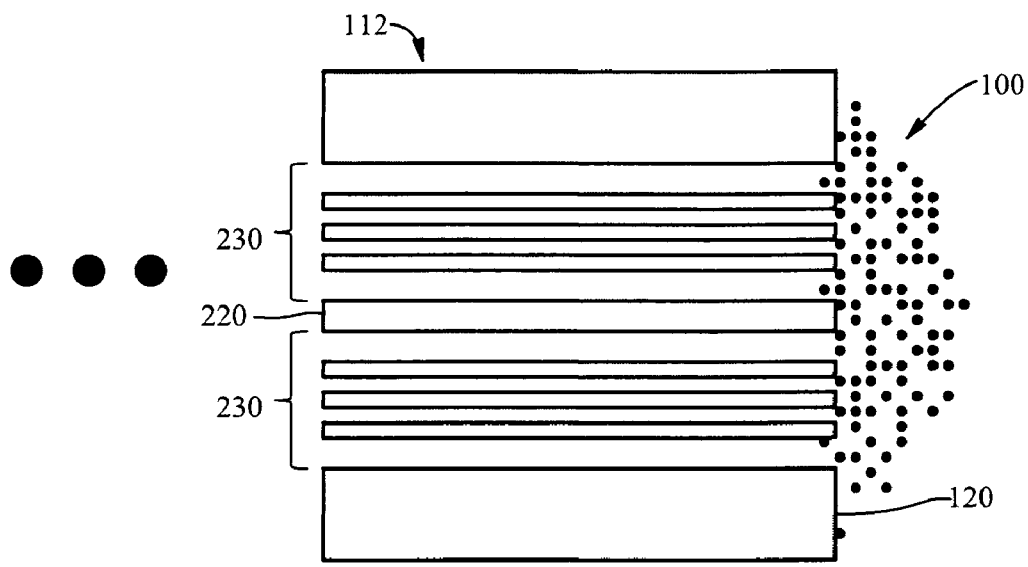
FIG. 3A is a schematic cross-sectional diagram of an end section of an example nano-engineered optical fiber as viewed along the length of the fiber, wherein the fiber has periodic voids, illustrating how the index-matching gel of the present invention does not substantially fill the nano-engineered voids at the end of the nano-engineered optical fiber.

Index-matching gel 100 of the present invention is constituted so that it does not substantially fill voids 232 at fiber end 120, as illustrated in FIG. 3A. The gel 100 is also pre-cured and formulated in a manner that results in cross-linking, thereby making the gel a "single-part" or "single-component" gel that can be used directly without adding additional constituents. The permanent cross-linked network within the gel greatly reduces migration of the gel 100 into voids 232. Gel 100 is thus a single-component, ready-to-use system that does not require meter mixing or heat curing, while being soft and flexible enough to provide minimum resistance to fiber insertion.

Figure 3B:
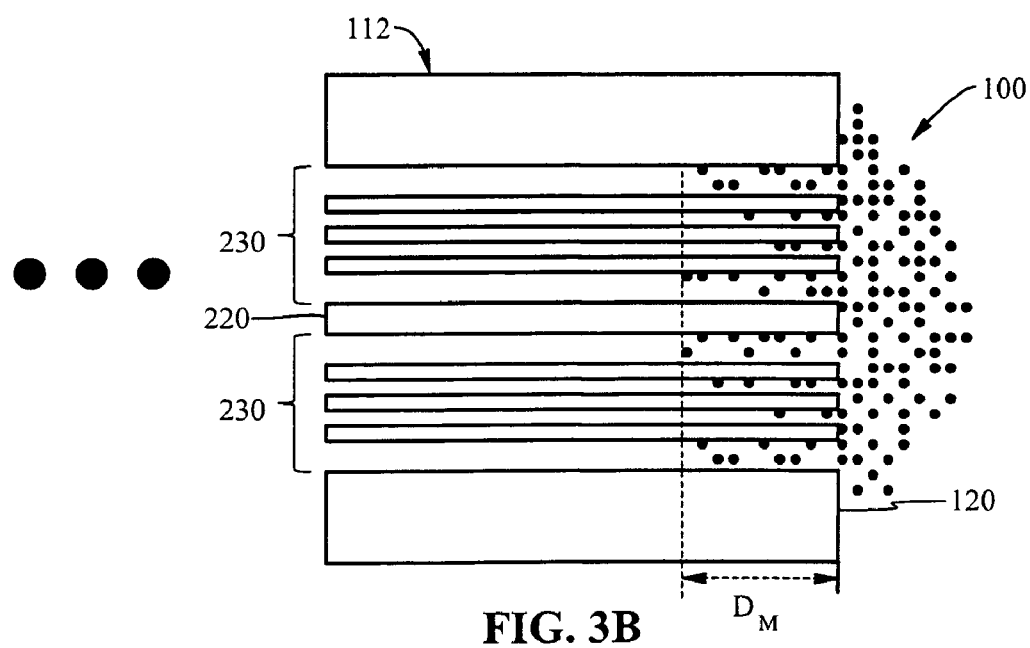
FIG. 3B is a schematic diagram similar to FIG. 3A, illustrating an example embodiment wherein the index-matching gel of the present invention migrates into the nano-engineered voids to a maximum depth $D_M$.

As illustrated in FIG. 3B, in an example embodiment of the invention, index-matching gel 100 is capable of migrating into voids 232 to a depth $D_M$ as measured from fiber end 120. However, unlike conventional index-matching gels, gel 100 only migrates into voids 232 to a limited, maximum depth $D_M$ that does not substantially impair the functionality of fiber 112 relative to its intended use. For example, nano-engineered optical fiber 112 may be used in a connector (i.e., connectorized) or in a splice assembly to splice two fibers, and depth $D_M$ may be such that the maximum extent of the migration of gel 100 does not extend to beyond the ferrule or housing ends, beyond the connector/splice housing, or beyond the connector boot (which would be about 40 mm in an example embodiment of a present-day fiber optic connector). Since the portion of nano-engineered optical fiber 112 is held within a ferrule or within a connector housing or within a connector boot and so is not likely to be subject to significant bending forces, the filling of voids 232 by the migration of gel 100 to a limited depth $D_M$ in such a case does not present a significant risk of performance reduction.

In an example embodiment, depth $D_M$ is no more that 2" and preferably no more that 1" beyond the edge of a housing or ferrule that contains fiber 112. In another example embodiment, depth $D_M$ is no more that 2" and preferably no more that 1" beyond the edge of a boot connected to the ferrule or housing. Example housings/ferrules are described below in connection with FIG. 8 et seq.

An example embodiment of gel 100 of the present invention is based on a siloxane polymer having the following general chemical formula:

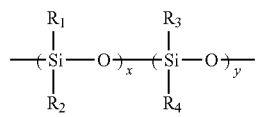

wherein $R_1$, $R_2$, $R_3$, and $R_4$ can be the same or different. The group may include a $C_1$-$C_{12}$ alkyl group (e.g. methyl, ethyl and the like), a $C_1$-$C_{12}$ alkoxy group (e.g. methoxy, ethyoxy and the like), an aromatic group, a halogenated (F, Cl, and Br; most preferably, Cl) aromatic or alkyl group, or a trimethylsiloxy group.

The refractive index of a polysiloxane is adjusted by the inclusion of diphenyl siloxane or phenyl-methyl siloxane. Although other refractive-index-modifying groups, such as cyclo-alkyl groups or aromatic groups, can also be used, typical co-polymers for optical index-matching compositions include dimethylsiloxane-phenylmethylsiloxane co-polymers or dimethylsiloxane-diphenylsiloxane co-polymers. Mixtures of two or more silicone polymers containing nearly the same aryl-alkyl (typically phenyl-methyl) ratio, at least one having a higher and one having a lower viscosity, can be mixed to obtain the correct viscosity and a refractive index to match the optical core. In some cases, mixtures of two or more polymers (preferably, silicones) having different viscosities, at least one having a higher and one having a lower viscosity, and different refractive indices, at least one having a higher and one having a lower refractive index, can be mixed to obtain the correct viscosity and a refractive index to match the optical core. These formulations may not perfectly match the refractive index of core 220, but the matches can be made sufficiently close (at a wavelength of operation of the fiber) to avoid significant attenuation of the signal over the short path lengths within fiber optic connectors.

Figure 4:
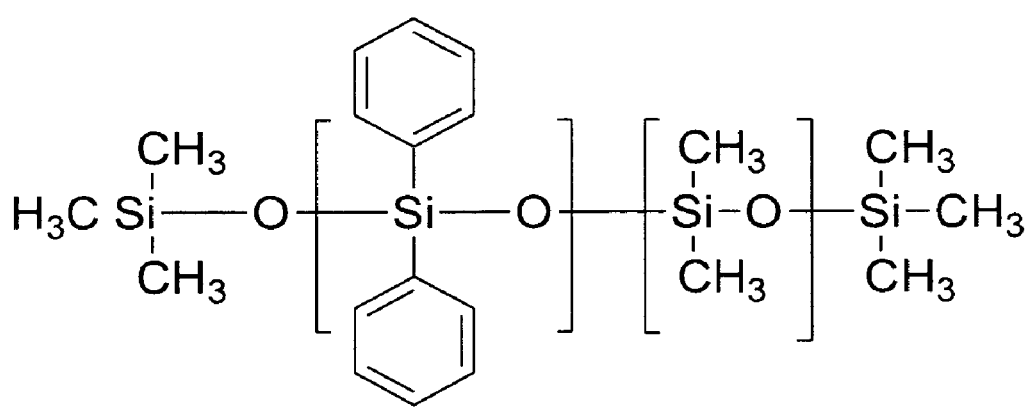
FIG. 4 illustrates an example siloxane polymer used in an example of the gel of the present invention, wherein the siloxane polymer is a trimethyl terminated-diphenylsiloxane-dimethylsiloxane copolymer.
Figure 5:
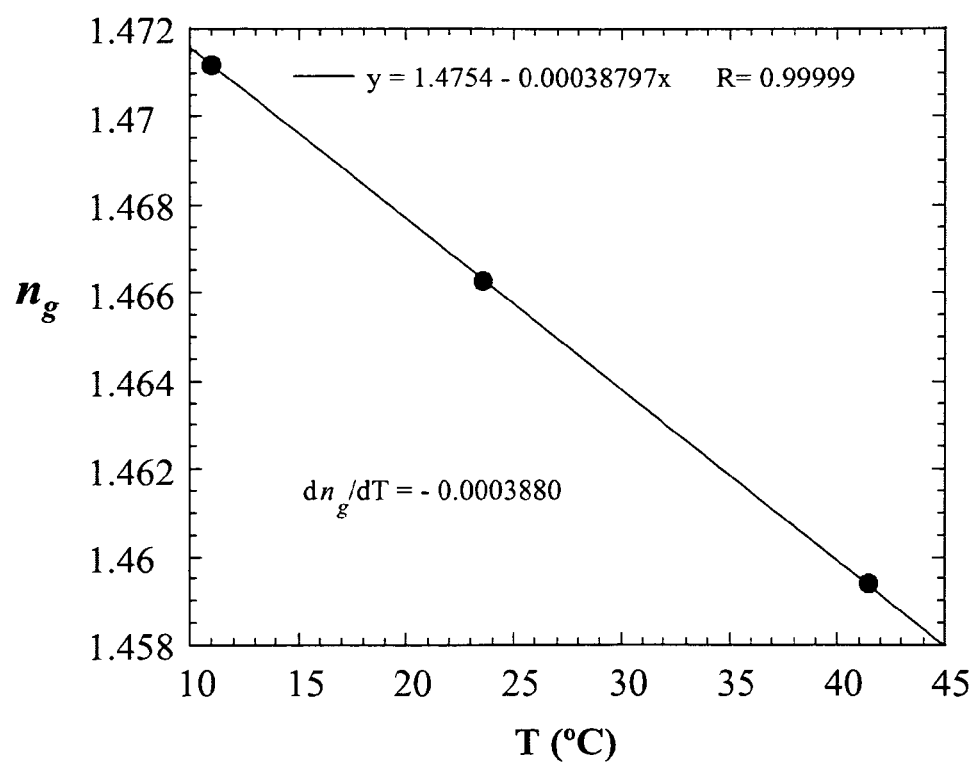
FIG. 5 is a plot of the gel index of refraction $n_g$ as a function of temperature T (° C.), illustrating the index-matching gel's relative insensitivity to changes in the refractive index as a function of temperature.

At a phenyl content of approximately 12-15 mole %, a polydimethyl siloxane/methylphenylsiloxane co-polymer has a refractive index that substantially matches that of fiber core 220 while rendering the index-matching gel 100 transparent or substantially transparent at the wavelengths used in optical fiber communications. Other co- or ter-polymers that contain the appropriate proportion of aryl and alkyl groups also produce gels 100 that are transparent and index-matching. FIG. 4 illustrates an example siloxane polymer used in an example of gel 100 of the present invention, wherein the siloxane polymer is a trimethyl terminated-diphenylsiloxane-dimethylsiloxane copolymer.

Table 1 below sets forth an example embodiment of the constituents of gel 100. In Table 1, ppm="parts per million" and cSt="CentiStoke".

TABLE 1

| | GEL CONSTITUENTS | | |
|---|---|---|---|
| | CONSTITUENT | PARTS | EXAMPLE |
| A | VINYL TERMINATED (15-17% DIPHENYLSILOXANE)-DIMETHYLSILOXANE COPOLYMER (800~10,000 cSt) | 50%-60% | 55% |
| B | METHYLHYDRO, (30-33% DIPHENYLSILOXANE)-DIMETHYLSILOXANE COPOLYMER (~600 cSt) | 0.2%-1.0% | 0.29% |
| C | DIMETHYL-(30-35% DIPHENYL-SILOXANE)COPOLYMER (1,000~13,000 cSt) | 40%-50% | 44% |
| D | PLATINUM DIPHENYL-DIMETHYL DIVINYL COMPLEX (catalyst) | 0.01%-0.02% <1 ppm in platinum | 0.015% |

Formulation variations within the above-listed ranges yield a correspondingly broad and useful range of softer or harder cured gel properties, which can be manipulated to suit the particular end-product environmental sealing requirements.

The constituents identified above are carefully selected within a designated optical refractive index range so as to provide a substantially index-matched connection. After the cure, gel 100 preferably has a refractive index $n_g$ within 5% of that of the nano-engineered optical fiber refractive index $n_f$, more preferably within 2% of $n_f$, and even more preferably within 1% of $n_f$.

In an example embodiment, after the cure, gel 100 preferably has a refractive index $n_g$ of about 1.46, as measured at an operating wavelength of the nano-engineered optical fiber. The gel 100 refractive index $n_g$ as a function of temperature T for the cross-linked silicone gel of the present invention has been characterized with a digital optical refractometer that has a measurement precision to the 4th decimal point. The results are plotted in FIG. 6. The completed formulation has a refractive index $n_g$=1.465 at 25° C. at a wavelength of 589 nm. The change in refractive index $n_g$ with temperature $dn_g/dT$ in the temperature range between 10° C. to 45° C. was measured to be a very low −0.000388.

The network structure formed by cross linking in the cured gel 100 is carefully controlled and designed to enable the cured gel to withstand deformation due to gravity (i.e., it does not readily flow), but can be dispensed easily under shear. An example procedure for making the index-matched gel 100 is as follows. The detailed formulation listed above should be prepared, well mixed, and devolatilized to eliminate small air bubbles. The mixture is then cured in an oven at a temperature of about 75° C. for 20 minutes. The cured gel 100 is inspected to ensure that there are no air bubbles. The gel 100 can be directly cured in polypropylene syringes used for dispensing the gel into mechanical splice structures and mechanical connectors such as UniCam® and OptiSnap® connectors and CamSplice™ mechanical splices from Corning Cable Systems, LLC, Hickory, N.C.

Figure 6:
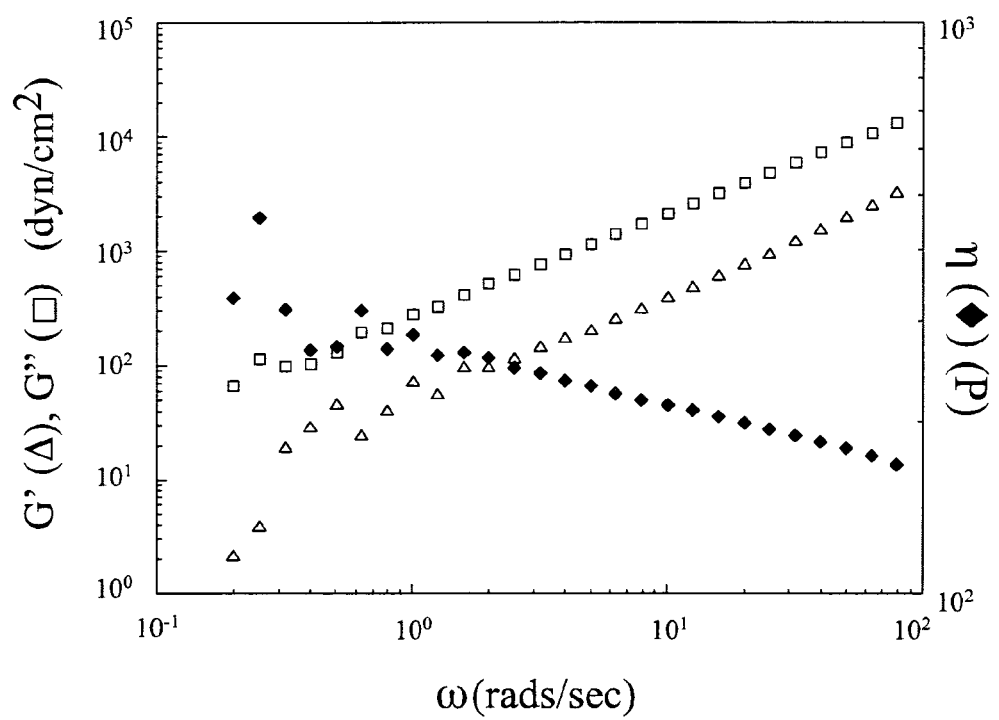
FIG. 6 is a plot of the elastic and viscous components of the shear modulus G' and G" in dynes/cm$^2$ (left-hand axis) and the dynamic viscosity ($\eta$) in poise P (right-hand axis) as a function of the shear frequency $\omega$ in rads/s for the index-matching gel of the present invention, illustrating that the gel has well-balanced viscoelastic properties over a large shear-frequency range.

The viscoelastic properties of an example formulation of gel 100 were characterized using the ARES rotational rheometer. FIG. 6 is a plot of the elastic and viscous components of the shear modulus G' and G" in dynes/cm² (left-hand axis) and the dynamic viscosity (η) in poise P (right-hand axis) as a function of the shear frequency ω in radians/second (rads/s) for gel 100. Shear frequency ω correlates with how rapidly the gel is strained into a connector during fiber insertion. The performance of a gel under these conditions is solely governed by the viscoelastic properties. From FIG. 6, it can be seen that the index-matching gel 100 has well balanced viscoelastic properties over the entire frequency range as reflected by the changes in G' and G" vs. frequency being almost parallel.

Index-matching gel 100 has been tested extensively with Unicam® and Opti Snap® connectors incorporating nano-engineered fibers 112 for optical performance under temperature cycling with humidity from −40° C. to 80° C. Gel 100 migration in nano-engineered fibers 110 was tested before and after the environmental cycling conditions. Results have shown that gel 100 has good optical performance and no migration has been detected during a three month, long-term temperature cycling with humidity environmental test.

Figure 7:
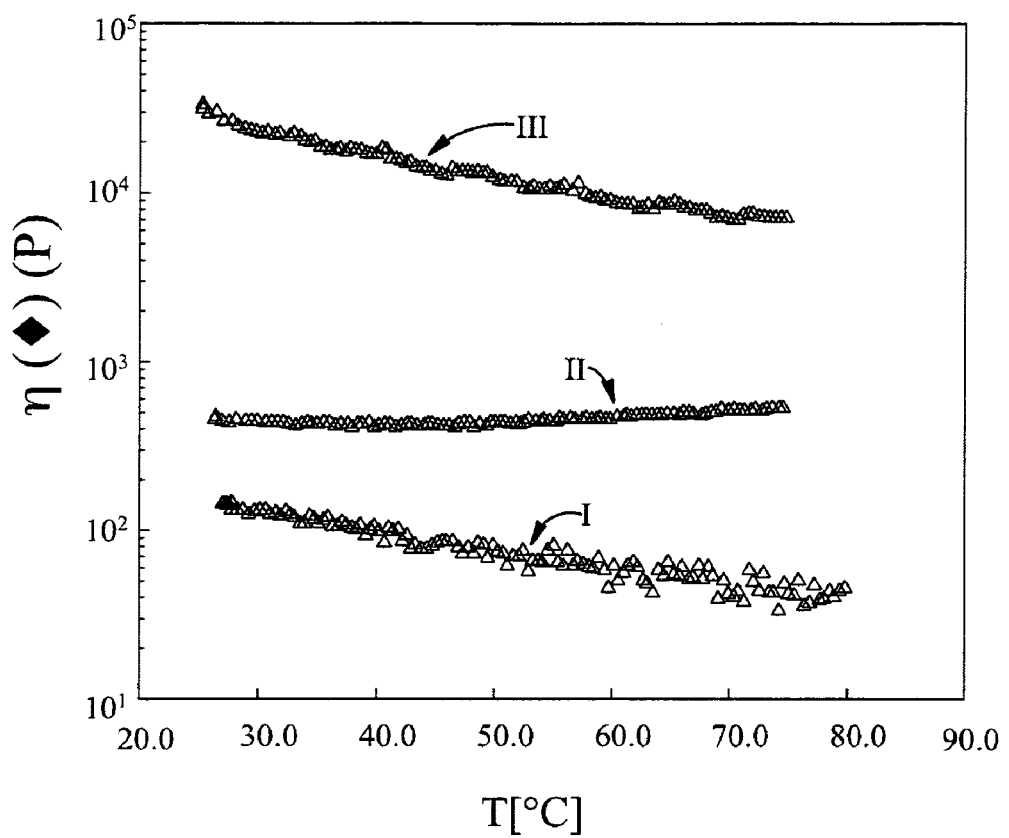
FIG. 7 is a plot of the viscosity $\eta$ (P) as a function of temperature T (° C.) for the index-matching gel of the present invention and two other index-matching substances, illustrating the index-matching gel's relative insensitivity to changes in viscosity as a function of temperature.

FIG. 7 is a plot of the viscosity η (P) as a function of temperature T (° C.) for gel 100 and two other index-matching substances, illustrating the index-matching gel's relative insensitivity to changes in viscosity as a function of temperature. The plot includes an index-matching silicone oil (Polydimethyl-diphenol siloxane oil) shown as curve I (bottom curve), an index-matching grease (e.g., from Nye Lubricants, Inc., Fairhaven, Mass.) shown as curve III (top), and an example of cross-linked index-matching gel 100 shown as curve II (middle). The viscosities η of both the oil and grease (curves I and III) have strong temperature dependence due to their non-cross-linked structures, and there is a substantial decrease in their viscosities with an increase in temperature. This property could increase the risk of the oil or grease wicking into the nano-engineered fiber. In contrast, the cross-linked gel 100 shows much less temperature dependency because of its cross-linked network structure. At elevated temperatures, the network structure prevents the gel 100 molecules from swelling and flowing, and in fact, the gel shows a slight increase in viscosity over a significant temperature range. This property prevents gel 100 from wicking into nano-engineered fiber 112 at higher temperatures.

In an example embodiment, gel 100 is index matched to provide the least possible amount of optical loss from reflection at fiber-fiber interface 122 formed by an optical fiber end 72 and nano-engineered optical fiber end 120. In another example embodiment, gel 100 may be index matched (or non-index matched, as the case may be) and applied to end 120 of nano-engineered optical fiber 112 to "seal" the end to prevent the ingress of other materials in the ambient environment. This may be done, for example, in connection with the treatment of cable ends or hardware cable stubs during shipment or installation to prevent migration of water, oils, etc, into voids 232 at open fiber end 120.

Example Mechanical Splice Assemblies

Aspects of the present invention include mechanical splice assemblies, and fiber optic connectors having such splice assemblies, that utilize index-matching gel 100 of the present invention. This makes the mechanical splice assemblies and connectors suitable for use with one or more nano-engineered optical fibers 112, such as those described in the aforementioned Corning nano-engineered fiber patents and patent applications. The example embodiment of the mechanical splice assemblies and fiber optic connectors of the present invention as described hereinbelow are based on simplified assemblies and connectors in order to illustrate the underlying principles of the invention. One skilled in the art will recognize that the assemblies and connectors of the present invention as described herein can be implemented with a number of specific types of fiber optic splices and connectors such as the aforementioned UniCam® and OptiSnap® connectors, the CamSplice™ splice assembly, and the splice assemblies and connectors as described in U.S. Pat. Nos. 4,923,274, 6,816,661 and 7,104,702, which patents are incorporated by reference herein.

Figure 8:
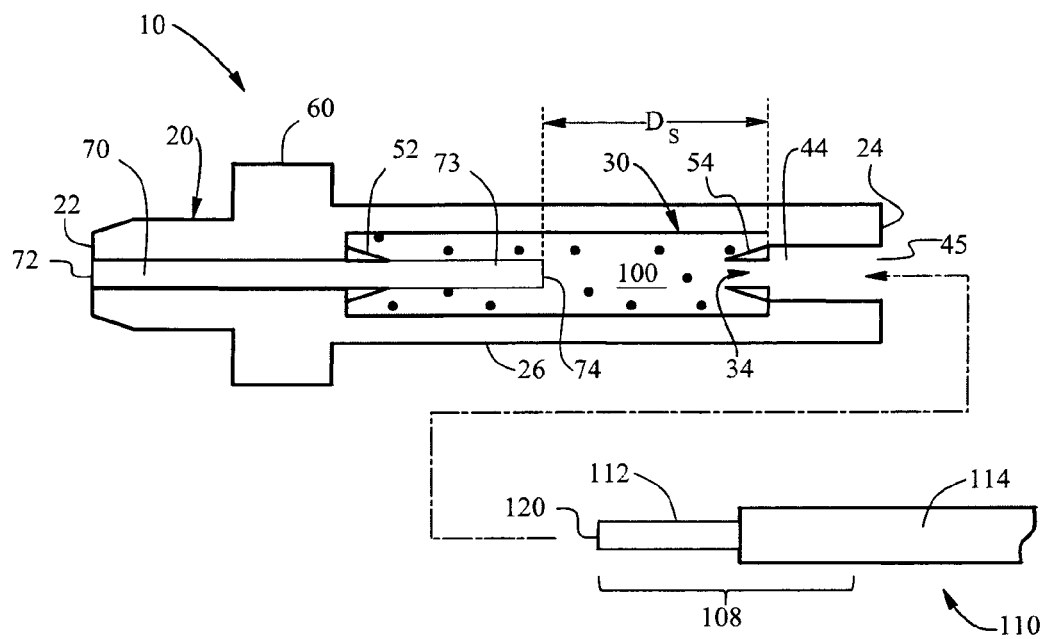
FIG. 8 is a schematic cross-sectional diagram of an example embodiment of a mechanical splice assembly according to the present invention, showing the index-matching gel held in the assembly and the nano-engineered optical fiber cable prior to being incorporated into the assembly.
Figure 9:
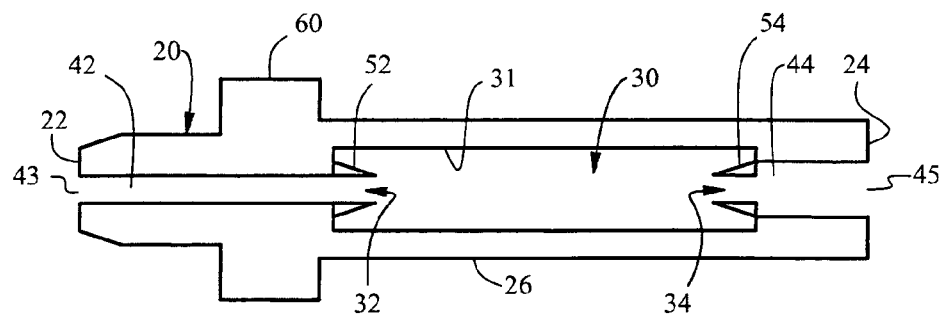
FIG. 9 is a schematic cross-sectional diagram of the ferrule of FIG. 8.

FIG. 8 is a schematic, cross-sectional view of an example embodiment of a mechanical splice assembly 10 according to the present invention. Assembly 10 includes a body 20 such as a ferrule or other type of housing. Body 20 is shown by itself in FIG. 9 for ease of illustration and explanation and is also referred to as "ferrule 20" for this and other embodiments below. With reference to FIG. 8 and FIG. 9, ferrule 20 includes first (front) and second (back) ends 22 and 24 and an outer surface 26. Ferrule 20 includes an interior chamber 30 defined by an inner surface 31 and has front and back open ends (openings) 32 and 34 that respectively open to front and back channels 42 and 44. Front channel 42 includes an open end 43 at ferrule first end 22, and back channel 44 has an open end 45 at ferrule second end 24. In an example embodiment, optical fiber channel 42 is sized to accommodate a bare optical fiber, while optical fiber channel 44 is sized to accommodate a field optical fiber that includes its protective cover, as discussed below. In other example embodiments, front and back channels 42 and 44 are both sized to accommodate a bare optical fiber or a non-bare optical fiber, depending on the particular function of ferrule 20 (e.g., connectorization, splicing to the same type of fiber, splicing to different types of fibers, etc.)

Assembly 10 further includes frontward and backward guides 52 and 54 arranged within chamber 30 at front and back openings 32 and 34, respectively. Guides 52 and 54 are sized to pass a bare optical fiber and support the optical fiber within chamber 30. In an example embodiment, assembly 10 includes a retaining ring 60 on outer surface 26 at or near ferrule end 22 so that the assembly can reside within a ferrule holder of a fiber optic connector, as discussed below.

With reference to FIG. 8, assembly 10 includes an optical fiber 70 arranged in front channel 42 and that passes through front guide 52 so that an end portion 73 with an end 74 protrudes partway into chamber 30 so that the end resides in the chamber. In an example embodiment, optical fiber 70 is a fiber section called a "fiber stub" that includes a front end 72 that is polished and flush with ferrule first end 22, as shown in FIG. 8. In an example embodiment, fiber end 74 is flat or is cleaved at an angle. Fiber 70 may be formed from either a nano-engineered optical fiber or a non-nano-engineered optical fiber. Chamber 30 contains index-matching gel 100.

With continuing reference to FIG. 8, in an example embodiment, mechanical splice assembly 10 is adapted to accommodate, via ferrule end 24, an end portion 108 of nano-engineered optical fiber cable 110 having a nano-engineered optical fiber 112 and including protective cover 114. Nano-engineered optical fiber end 120 is preferably flat or cleaved when used in assembly 10.

Figure 10:
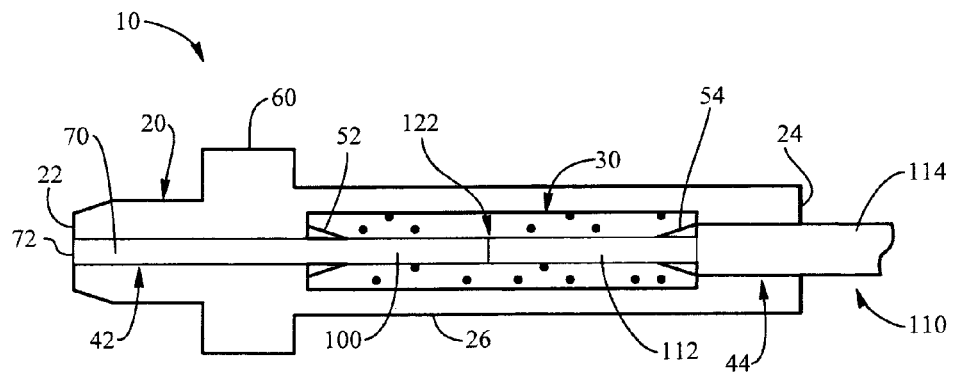
FIG. 10 is the same mechanical splice assembly as shown in FIG. 8, but with the nano-engineered optical fiber cable incorporated into the assembly.

FIG. 10 is a schematic side view similar to FIG. 8, illustrating the nano-engineered optical fiber cable 110 incorporated into mechanical splice assembly 10. Nano-engineered optical fiber 112 is introduced into back channel 44 at ferrule back end 24 and is passed through back guide 54 until nano-engineered optical fiber end 120 interfaces with fiber stub end 74 in chamber 30 at fiber-fiber interface 122. Nano-engineered optical fiber cable 110 is also held in back channel 44, which is sized to fit the cable with protective cover 114. In order to ensure a proper fit of end portion 108 of nano-engineered optical fiber cable 110 in assembly 10, protective cover 114 is stripped back by a length corresponding to a distance $D_s$ between fiber stub back end 74 and back chamber opening 34 (FIG. 8).

Note that in the example embodiment of mechanical splice assembly 10 of FIG. 8, fiber 70 may be formed from a section of a nano-engineered optical fiber, and the field optical fiber described above as a nano-engineered optical fiber cable 110 may be a non-nano-engineered optical fiber cable.

Figure 11:
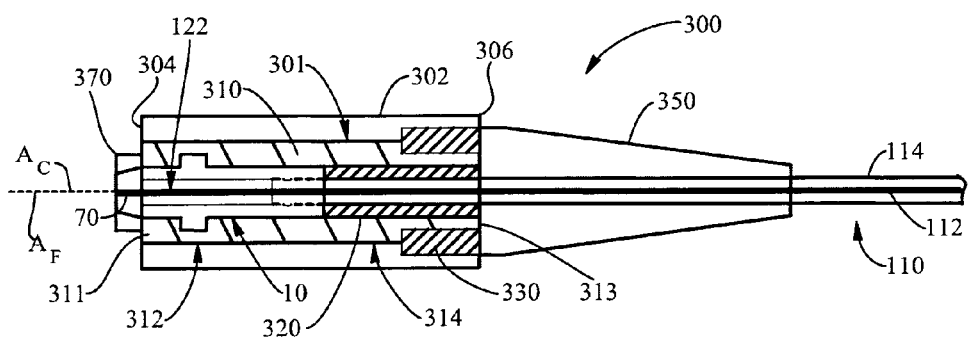
FIG. 11 is a schematic cross-sectional diagram of a simplified fiber optic connector according to the present invention that includes the mechanical splice assembly and index-matching gel of the present invention.

FIG. 11 is a schematic, cross-sectional diagram of a simplified fiber optic connector 300 according to the present invention that includes mechanical splice assembly 10. Connector 300 includes a connector housing 302 having an interior 301, front and back ends 304 and 306, and a central axis $A_C$ that runs through the interior. Housing 302 houses in interior 301 a ferrule holder 310 that has a front end 311 with a front-end portion 312 sized to accommodate mechanical splice assembly 10. Ferrule holder 310 also includes a back-end portion 314 with a back end 313 sized to receive a support ferrule 320 that in turn is sized to hold a field fiber cable, which is a nano-engineered fiber cable 110 in the present example embodiment.

Connector 300 also includes a crimp ring 330 arranged around ferrule holder 310 at back end 314. Crimp ring 330 is crimpled to cause the back portion of ferrule holder 310 and support ferrule 320 held therein to squeeze nano-engineered optical fiber 112 in order to provide strain-relief. A flexible connector tail (or "boot") 350 is connected to housing back end 306 and to nano-engineered optical fiber cable 110 to provide further stress relief. Housing front end 304 includes an alignment member 370 that serves to align and hold connector 300 to another connector or to the device port to which connector 300 is to be connected.

Connector 300 is particularly well suited for use in the field in which nano-engineered optical fiber cables are used as field cables. Connector 300 can be field-installed on a nano-engineered field cable using the same or similar techniques used to field-install conventional SC, LC and ST® compatible connectors such as Corning UniCam® Connectors made by Corning Cable Systems, Hickory, N.C.

Figure 12:
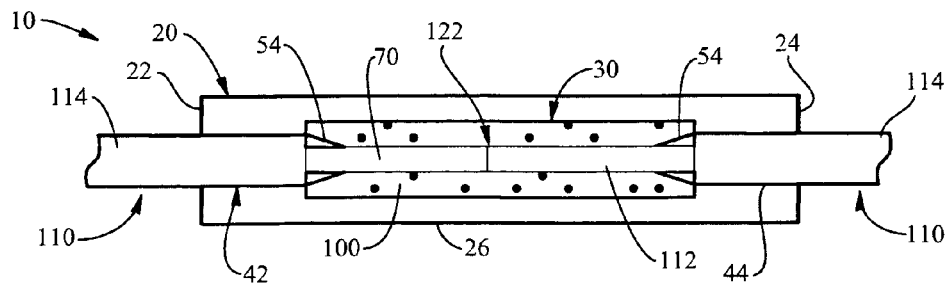
FIG. 12 is a schematic cross-sectional diagram of another example embodiment of a mechanical splice assembly for forming a mechanical splice between two fibers.

FIG. 12 is a schematic, cross-sectional diagram of another example embodiment of a mechanical splice assembly 10. Body 20 of FIG. 12 is similar to that shown in FIG. 8, but wherein optical fiber channels 42 and 44 are each sized to accommodate the fiber protective cover. Mechanical splice assembly 10 of FIG. 12 is suitable for splicing two different types of fibers 70 and 112, or two of the same types of fibers (i.e., fiber 70 is the same type of fiber as fiber 112).

CamSplice™ Mechanical Splice with Index-Matching Gel

Figure 13:
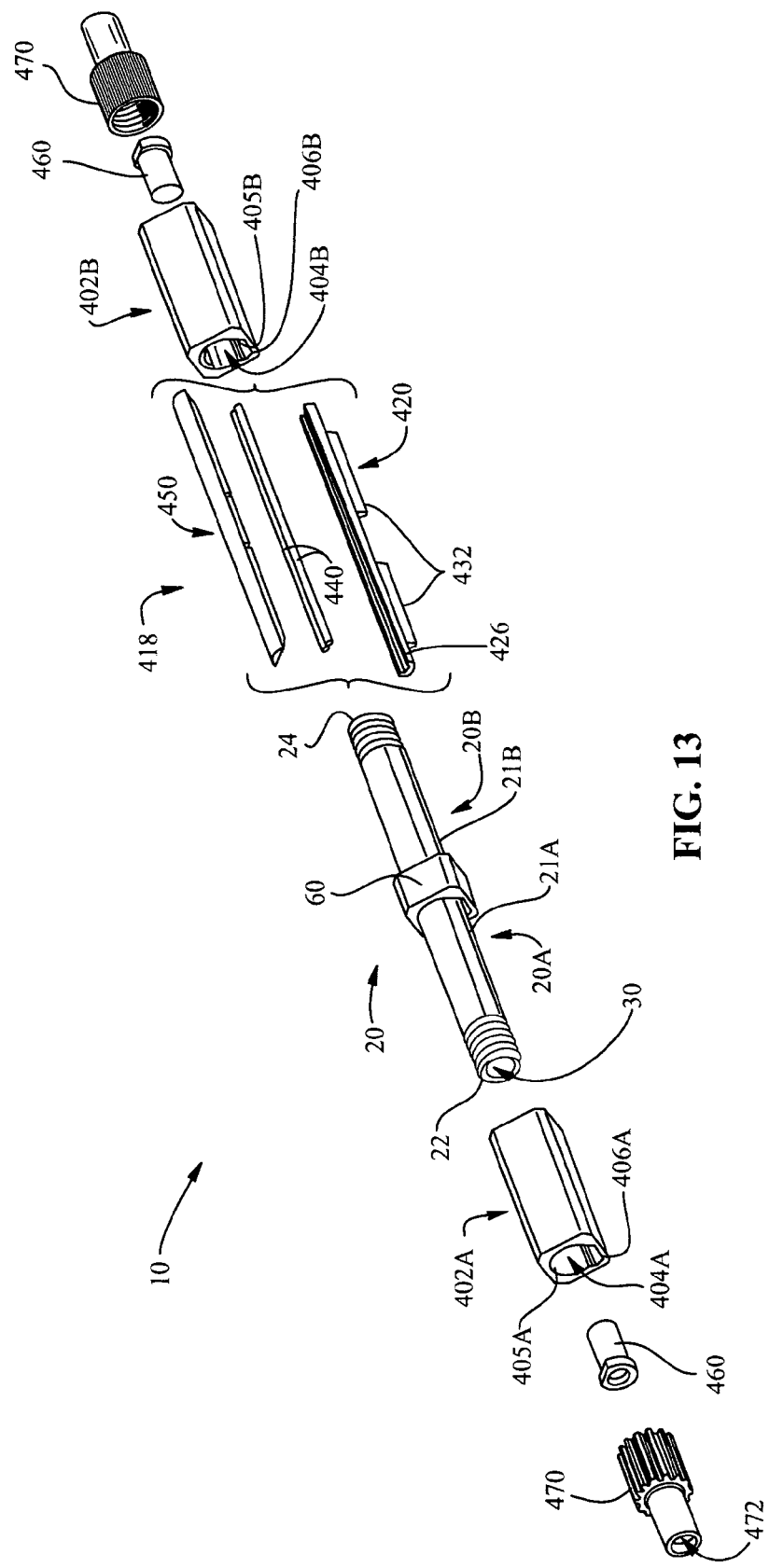
FIG. 13 is an exploded view of an example of a Cam-Splice™ mechanical splice assembly.
Figure 14:
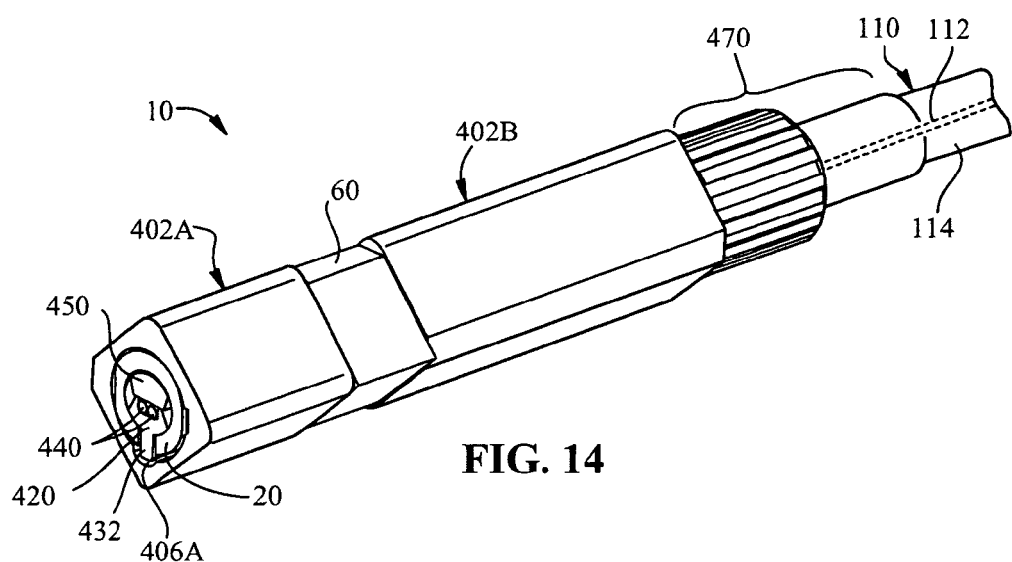
FIG. 14 is a perspective view of the completed assembly that also shows a cross-section of the assembly.
Figure 15:
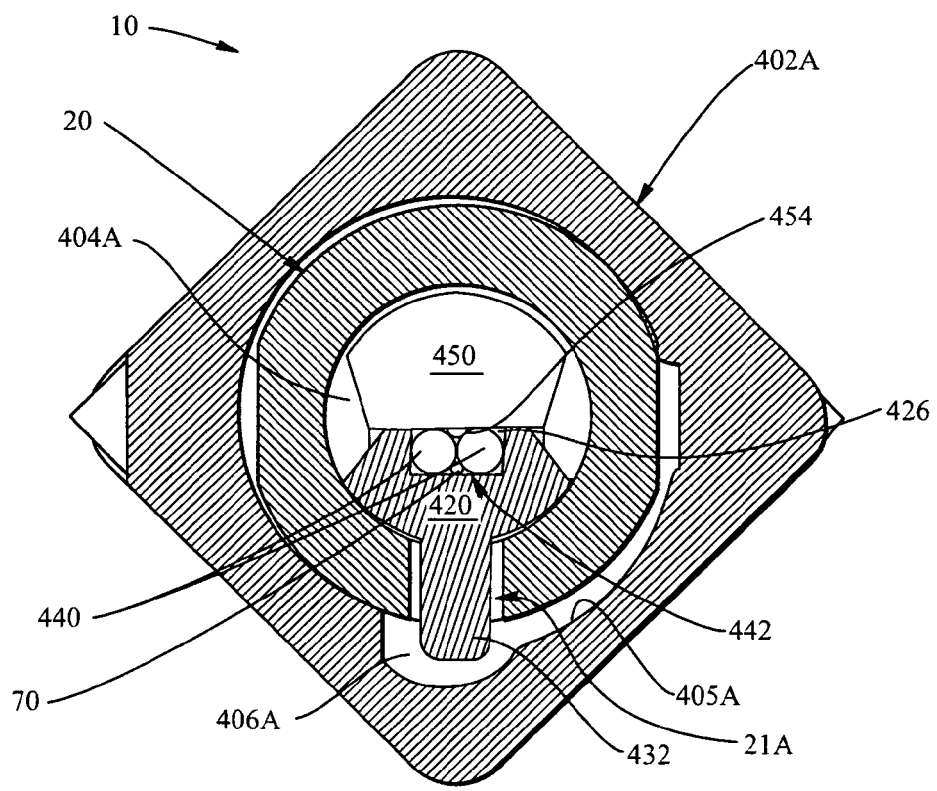
FIG. 15 is a close-up cross-sectional view shown in FIG. 14.

An example mechanical splice assembly 10 such as shown in a generalized configuration in FIG. 12 includes the CamSplice™ mechanical splice assembly available from Corning Cable Systems, Inc., Hickory, N.C. Mechanical splice assembly 10 of FIG. 13 shows an example of a CamSplice™ mechanical splice assembly 10. FIG. 14 is a perspective cut-away view of the completed assembly, and FIG. 15 is an end-on view of the cross-section shown in FIG. 14.

Mechanical splice assembly 10 of FIG. 13 includes body 20, which is referred to in the present example as "inner housing" 20, which includes first (front) and second (back) sections 20A and 20B separated by ring 60 on outer surface 26. Housing sections 20A and 20B include respective bottom apertures 21A and 21B. Two outer housing sections 402A and 402B referred to hereinafter as front and back "cam sections" slide over respective threaded ends inner housing ends 22 and 24 to cover front and back inner housing sections 20A and 20B. Each cam section 402A and 402B includes an eccentric interior region 404A and 404B defined by respective inner surfaces 405A and 405B, which surfaces include respective detents 406A and 406B.

Figure 16A:
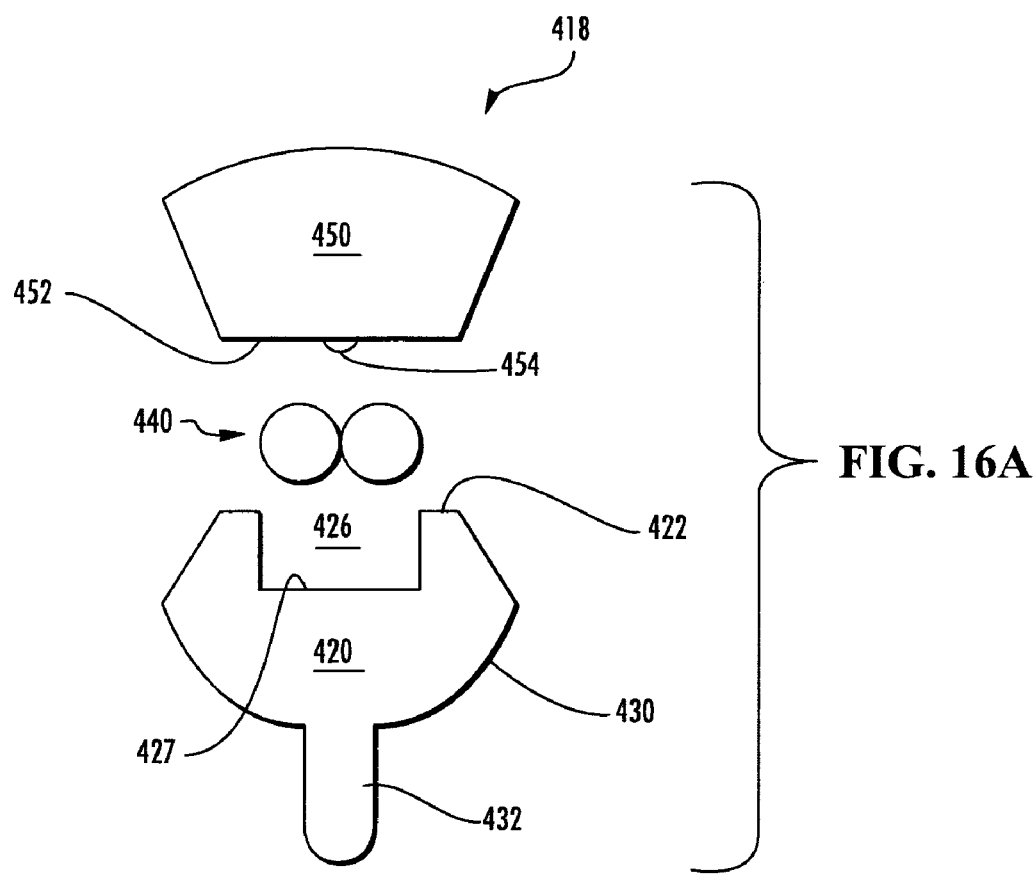
FIG. 16A is an end-on exploded view of the splice assembly shown in FIG. 13.

A splice assembly 418 is disposed within chamber interior 30 of inner housing 20. FIG. 16A is an exploded end-on view of splice assembly 418. Splice assembly 418 includes a bottom member 420 having a top surface 422 with a channel 426 formed therein. Channel 426 has a bottom 427. Bottom member 420 also has a curved bottom surface 430 that generally conforms to housing inner surface 31 and that includes two "keels" or "ribs" 432 sized to fit through inner housing apertures 21A and 21B. Splice assembly also includes two rods 440 (e.g., glass rods) that reside in channel 426 and that occupy most of the channel. With reference to the close-up view of FIG. 16B, rods 440 and channel bottom 427 define a fiber channel 442 sized to accommodate bare optical fibers (e.g., fibers 70 and 112) in an end to end arrangement like that shown in FIG. 12. In an example embodiment, one or both of fibers 70 and 112 are nano-engineered fibers.

Splice assembly 418 also includes a top member 450 with a flat bottom surface 452 that includes a nub or bump 454. Top member 450 resides with flat bottom surface 452 atop flat top surface of bottom member 420 and covering channel 426. Nub 454 fits between glass rods 440 and serves to keep the rods fixed in place within channel 426.

Mechanical splice assembly 10 of FIG. 13 also includes two fiber guides 460 (e.g., ferrules) that fit within respective ends 22 and 26 of inner housing and that include a central aperture sized to accommodate optical fiber 112. Assembly 10 also includes threaded caps 470 that have a central aperture 472 sized to accommodate cable 110 and that threadedly engage with respective inner housing ends 22 and 24 to secure fiber guides 460 to their respective cam sections 402A and 402B. Threaded caps 470 define respective splice assembly ends.

Figure 16B:
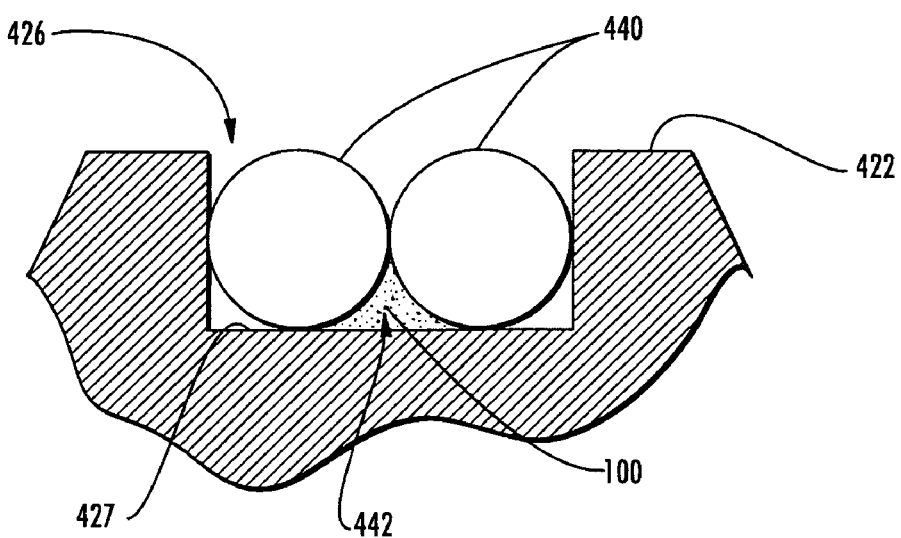
FIG. 16B is a close-up view of the bottom member of the splice assembly showing the arrangement of the glass rods in the member channel to form the fiber channel, and also showing the index-matching gel of the present invention disposed in the fiber channel.
Figure 17:
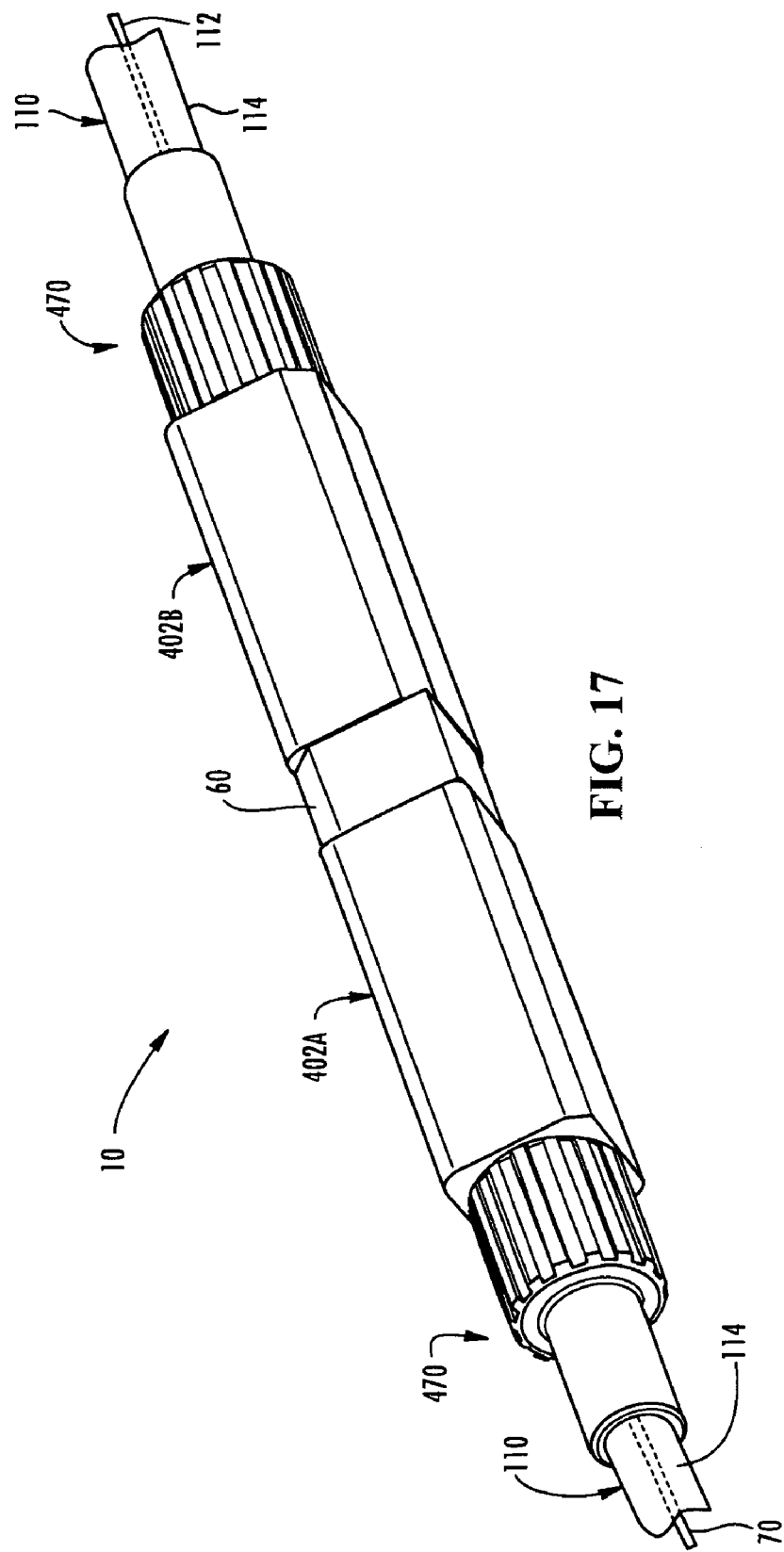
FIG. 17 is a perspective view of the completed Cam-Splice™ mechanical splice assembly.

In operation, splice assembly 418 is assembled with gel 100 included in fiber channel 442 (see FIG. 16B). Assembly 418 is then disposed within interior chamber 30 of inner housing 20. Once so arranged, the optical fibers 70 and 112 to be spliced can then be inserted into opposite ends of fiber channel 442 at opposite ends of splice assembly 418 so that the respective end faces 74 and 120 meet to form fiber-fiber interface 122 that includes index-matching gel 100 between the end faces. Front and back cam sections 402A and 402B are then placed over inner housing front and back sections 20A and 20B and rotated relative to the inner housing. The causes respective ribs 432 of splice bottom member 420 to engage respective cam inner surfaces 405A and 405B, which presses the splice bottom member against the splice top member 450, thereby compressing the splice assembly and securing the splice interface 122. The remaining components are then added to mechanical splice assembly 10 as described above to complete its fabrication. The completed Cam-Splice™ mechanical assembly 10 is shown in FIG. 17.

It will be apparent to those skilled in the art that various modifications and variations can be made to the present invention without departing from the spirit and scope of the invention. Thus, it is intended that the present invention cover the modifications and variations of this invention, provided they come within the scope of the appended claims and their equivalents.

What is claimed is:

1. An index-matching gel for use with a nano-engineered optical fiber having at least one refractive index $n_f$, comprising:
   a formulation comprising a non-reactive constituent A, two reactive constituents B and C, and a catalyst D that, when pre-cured, forms a cross-linked, single-component gel that does not require meter mixing of an additional constituent and heat curing, the gel having a refractive index $n_g$ within 5% of $n_f$ at an operating wavelength of the nano-engineered optical fiber.

2. The index-matching gel of claim 1, wherein the non-reactive constituent A comprises vinyl terminated (15-17% diphenylsiloxane)-dimenthylsiloxane copolymer (800~10,000 CentiStoke).

3. The gel of claim 2, wherein the two reactive components B and C respectively comprise:
   methylhydro (30-33% diphenylsiloxane)-dimethylsiloxane copolymer (~600 CentiStoke (cSt); and
   dimethyl-(30-35% diphenylsiloxane)-copolymer (1,000~13,000 cSt).

4. The index-matching gel of claim 3, wherein the catalyst D comprises platinum diphenyl-dimethyl divinyl complex.

5. The index-matching gel of claim 4, wherein constituent A constitutes between 50% to 60% of the formulation.

6. The index-matching gel of claim 5, wherein:
   constituent B constitutes between 0.2% and 4% of the formulation; and
   constituent C constitutes 40% to 50% of the formulation.

7. The index-matching gel of claim 6, wherein constituent D constitutes between 0.01% and 0.02% of the formulation.

8. The index-matching gel of claim 6, wherein:
   constituent A constitutes 55% of the formulation;
   constituent B constitutes 0.29% of the formulation; and
   constituent C constitutes 44% of the formulation.

9. The index-matching gel of claim 1, wherein $n_g$ is about 1.46 at the operating wavelength of the nano-engineered optical fiber.

10. A mechanical splice assembly, comprising:
    a body having opposite front and back ends, an interior chamber between the front and back ends, and front and back channels open to the interior chamber and open at the respective front and back ends;
    a first optical fiber having an end and held in the front channel so that the first optical fiber end resides within the interior chamber; and
    an index-matching gel contained in the interior chamber, the index-matching gel having a formulation comprising: a non-reactive constituent A, two reactive constituents B and C, and a catalyst D that, when pre-cured, forms a cross-linked, single-component gel that does not require meter mixing of an additional constituent and heat curing, the gel having a refractive index $n_g$ within 5% of $n_f$ at an operating wavelength of the nano-engineered optical fiber.

11. The mechanical splice assembly of claim 10, further including:
    a second optical fiber having an end and a nanostructure region with voids, wherein the second optical fiber is held within the back channel so that the second optical fiber end is interfaced with the first optical fiber end within the interior chamber, and so that the index-matching gel provides substantial index-matching between the first optical fiber end and the second optical fiber end without substantially filling the voids of the second optical fiber.

12. The mechanical splice assembly of claim 11, wherein the first optical fiber includes a nanostructure region with voids, and wherein the index-matching gel does not substantially fill the voids of the first optical fiber.

13. The mechanical splice assembly of claim 10, wherein the first optical fiber is a stub fiber that extends to the ferrule front end.

14. The mechanical splice assembly of claim 10, further including:
    a nano-engineered optical fiber having an end and a nano-engineered region with voids, wherein the nano-engineered optical fiber is held within the back channel so that the nano-engineered fiber end is interfaced with the first optical fiber end, and so that the index-matching gel provides substantial index-matching between the fiber optical fiber end and the nano-engineered fiber end, and wherein the index-matching gel migrates into the voids to a maximum depth $D_M$ as measured from the nano-engineered fiber end, wherein the depth $D_M$ does not extend beyond the ferrule back end.

15. The mechanical splice assembly of claim 10, wherein the index-matching gel comprises:
    the non-reactive constituent A comprising vinyl terminated (15-17% diphenylsiloxane)-dimenthylsiloxane copolymer (800~10,000 CentiStoke (cSt));
    the two reactive components B and C respectively comprising methylhydro, (30-33% diphenylsiloxane)-dimethylsiloxane copolymer (~600 cSt) and dimethyl-(30-35% diphenylsiloxane)-copolymer (1,000~13,000 cSt); and the catalyst D comprising platinum diphenyl-dimethyl divinyl complex.

16. The mechanical splice assembly of claim 15, wherein:
constituent A constitutes 55% of the formulation;
constituent B constitutes 0.29% of the formulation; and
constituent C constitutes 44% of the formulation.

17. A fiber optic connector, comprising:
the mechanical splice assembly of claim 10;
a holder for holding the mechanical splice assembly, the holder having a back end configured to receive an optical fiber and a back end portion configured to support the optical fiber cable; and
a housing that houses the holder.

18. The fiber optic connector according to claim 17, further including:
an optical fiber cable that includes a second optical fiber having a nano-engineered region with voids, wherein the cable is supported by the holder back end portion such that the second optical fiber is held within the back channel with the second optical fiber end interfacing with the first optical fiber end and index-matched thereto by the index-matching gel.

19. The fiber optic connector according to claim 18, further including:
a boot having an end, the boot covering the ferrule channel back end and a portion of the nano-engineered optical fiber cable; and
wherein the index-matching gel migrates into the voids to a depth $D_M$ as measured from the second optical fiber end, the depth $D_M$ does not extending more than 2" beyond the boot end.

20. The fiber optic connector according to claim 18, wherein depth $D_M$ does not extending beyond the boot end.

21. The fiber optic connector according to claim 18, wherein the first optical fiber is a stub optical fiber.

22. The mechanical splice assembly of claim 10, wherein the first and second optical fibers are not the same type of optical fiber.

23. A fiber optic connector having a back end, comprising:
a stub optical fiber having an end;
a second optical fiber having a nano-engineered region with voids and having an end; a splice assembly configured to interface the stub fiber and the second optical fiber together at their respective ends; and
an index-matching gel provided at the interface of the stub optical fibers, the gel having a formulation comprising: a non-reactive constituent A, two reactive constituents B and C, and a catalyst D that, when pre-cured, forms a cross-linked, single-component that does not require meter mixing of an additional constituent and heat curing, the gel having a refractive index $n_g$ within 5% of $n_f$ at an operating wavelength of the nano-engineered optical fiber.

24. The fiber optic connector of claim 23, wherein the second optical fiber extends from the connector back end, and wherein the index-matching gel migrates into the voids to a depth $D_M$ that does not extend beyond 2" from the connector back end.

25. The fiber optic connector of claim 24, wherein depth $D_M$ does not extend beyond the connector back end.

26. A mechanical splice assembly for splicing first and second optical fibers having respective ends, wherein at least one of the fibers is a nano-engineered fiber, the assembly comprising:

an interior housing having an interior region;
a splice assembly sized to fit into the interior region and defining a fiber channel sized to accommodate the first and second optical fibers end to end; and
an index-matching gel contained in the fiber channel, the index-matching gel having a formulation comprising: a non-reactive constituent A, two reactive constituents B and C, and a catalyst D that, when pre-cured, forms a cross-linked, single-component gel that does not require meter mixing of an additional constituent and heat curing, the gel having a refractive index $n_g$ within 5% of $n_f$ at an operating wavelength of the nano-engineered optical fiber.

27. The mechanical splice assembly of claim 26, further including the first and second optical fibers disposed end to end in the fiber channel so that index-matching gel resides between the fiber ends.

28. The mechanical splice assembly of claim 27, wherein the first and second optical fibers are not the same type of optical fiber.

29. The mechanical splice assembly of claim 27, wherein both the first and second optical fibers are nano-engineered optical fibers.

30. The mechanical splice assembly of claim 27, wherein the splice assembly includes:
a bottom member having an top surface with a channel formed therein, the channel having a bottom; and
first and second rods arranged in the member channel so as to define, in combination with the channel bottom, said fiber channel.

31. The mechanical splice assembly of claim 30, further including:
a top member having a bottom surface and that resides atop the bottom member to cover the member channel;
at least one rib that protrudes from the bottom member and through the inner housing; and
at least one cam housing surrounding at least a portion of the inner housing and configured to engage the rib when the cam housing is rotated relative to the inner housing so as to compress the splice assembly.

32. The mechanical splice assembly of claim 27, wherein the index-matching gel comprises:
the non-reactive constituent A comprising vinyl terminated (15-17% diphenylsiloxane)-dimenthylsiloxane copolymer (800~10,000 CentiStoke (cSt));
the two reactive components B and C respectively comprising methylhydro, (30-33% diphenylsiloxane)-dimethylsiloxane copolymer (~600 cSt) and dimethyl-(30-35% diphenylsiloxane)-copolymer (1,000~13,000 cSt); and
the catalyst D comprising platinum diphenyl-dimethyl divinyl complex.

33. The mechanical splice assembly of claim 30, wherein:
constituent A constitutes 55% of the formulation;
constituent B constitutes 0.29% of the formulation; and
constituent C constitutes 44% of the formulation.

34. The mechanical splice assembly of claim 27, wherein the assembly has respective first and second ends, and wherein the index-matching gel migrates into the voids to a depth $D_M$ that does not extend beyond 2" from either of the first or second splice assembly ends.

35. The mechanical splice assembly of claim 24, wherein depth $D_M$ does not extend beyond either of the first or second splice assembly ends.

* * * * *